US012612500B2

(12) United States Patent
Ketusky et al.

(10) Patent No.: US 12,612,500 B2
(45) Date of Patent: Apr. 28, 2026

(54) HEAT LABILE FOAM-IN-PLACE POLYURETHANE FOAM

(71) Applicants: BATTELLE SAVANNAH RIVER ALLIANCE, LLC, Aiken, SC (US); Nicholas M. Marshall, Graniteville, SC (US)

(72) Inventors: Edward T. Ketusky, Beech Island, SC (US); Mark D. Kranjc, Aiken, SC (US); James M. Shuler, Germantown, MD (US); Nicholas M. Marshall, Graniteville, SC (US)

(73) Assignees: Battelle Savannah River Alliance LLC, Aiken, SC (US); Nicholas M. Marshall, Graniteville, SC (US)

( * ) Notice: Subject to any disclaimer, the term of this patent is extended or adjusted under 35 U.S.C. 154(b) by 536 days.

(21) Appl. No.: 17/965,297

(22) Filed: Oct. 13, 2022

(65) Prior Publication Data

US 2024/0141127 A1 May 2, 2024

(51) Int. Cl.

| | |
|---|---|
| ***C08J 9/12*** | (2006.01) |
| ***B32B 5/18*** | (2006.01) |
| ***C08G 18/08*** | (2006.01) |
| ***C08G 18/66*** | (2006.01) |
| ***C08G 18/72*** | (2006.01) |

(52) U.S. Cl.

CPC ................. *C08J 9/125* (2013.01); *B32B 5/18* (2013.01); *C08G 18/14* (2013.01); *C08G 18/6666* (2013.01); *C08G 18/72* (2013.01); *B32B 2266/0278* (2013.01); *B32B 2439/00* (2013.01); *C08J 2203/10* (2013.01); *C08J 2375/06* (2013.01)

(58) Field of Classification Search

None

See application file for complete search history.

(56) References Cited

U.S. PATENT DOCUMENTS 3,909,497 A 9/1975 Hendry et al.
5,262,447 A * 11/1993 Tucker ................. C08G 18/482 427/373
2005/0213910 A1 9/2005 Chang et al.
2006/0210785 A1 9/2006 Takada et al.
2008/0070154 A1 3/2008 Taguchi
2008/0070998 A1 3/2008 Takada et al.
2009/0214875 A1 8/2009 Paschkowski
2011/0014096 A1 1/2011 Fukuoka et al.
2012/0208015 A1 8/2012 Takahira et al.
2018/0334529 A1 11/2018 García Ruiz et al.
2021/0269612 A1* 9/2021 Cassidy ............. C08G 18/4222
2022/0081506 A1* 3/2022 Izawa .................... C08G 65/20
2023/0002540 A1* 1/2023 Sherren .................. C08G 18/12

FOREIGN PATENT DOCUMENTS

CN 108047683 A 5/2018
JP H 04178412 A 6/1992
JP H 05170964 A 7/1993
JP 2014118316 A 6/2014
WO WO-2010066211 A1 * 6/2010 ......... C08G 18/3836

OTHER PUBLICATIONS

Tada et al., "Excitation Wavelength Dependence of Laser Ablation Mechanism of Urethane-Urea Copolymer Film Studied by Time-Resolved Absorbance Measurements", Journal of Photoscience, vol. 10(1), 2003, pp. 97-104.
Zheng et al., "Synthesis and Photochromism Properties of Anionic Waterborne Polyurethane Containing Azobenzene Chromophores", Journal of Macromolecular Science, Part A, Pure and Applied Chemistry, vol. 52—2015, pp. 942-949.

* cited by examiner

*Primary Examiner* — Thomas J Kessler

(74) *Attorney, Agent, or Firm* — Dority & Manning, P.A

(57) ABSTRACT

Disclosed are foamable compositions that can be particularly beneficial for foam-in-place packaging purposes. The foamable compositions can be reacted to form a polyurethane foam that can be utilized to secure packaging contents inside a transport packages, and that at a later time can be readily decomposed at low degradation temperatures, e.g., about 90° C. or less. The polyurethane foam can also act as a sink for hydrogen radicals and as such can be utilized for transport of high energy emitting materials, e.g., γ-radiating materials.

24 Claims, No Drawings

HEAT LABILE FOAM-IN-PLACE POLYURETHANE FOAM

FEDERAL RESEARCH STATEMENT

This invention was made with Government support under Contract No. 893033210EM000080, awarded by the U.S. Department of Energy. The Government has certain rights in the invention.

BACKGROUND

Polyurethane foams based upon polyol/diisocyanate formulations are common in industry for forming packaging material useful in securement and transportation of articles. The vast majority of polyurethane polyols are polyethers based on poly(propylene oxide) and poly(ethylene oxide), while methylene diphenyl diisocyanate (MDI) is the most common diisocyanate component.

Existing foam-in-place systems are based on polyurethane two-component mixtures, which are mixed and blown into a package and form the foam securement material in situ. Conveniently, most polyurethane formulations are based on prepolymers which are incorporated into a reactive mixture containing the catalyst, surfactant, and blowing agent.

The thermal stability of packaging/transport polyurethanes is important, especially with regard to high temperature stable polyurethanes for purposes of fire safety. However, a desire for low temperature degrading polyurethanes also exists, as the ability to remove articles from the surrounding packaging foam at low temperatures would be beneficial. There exists description of polyurethanes that degrade or become flowable under relatively mild temperatures of about 180° C. The extant literature incorporates this property by incorporating a labile azo bond into the backbone of the polyol. Structures containing this moiety react by bond scission through homolysis when heated, resulting in the formation of nitrogen gas and the production of free radicals.

While this strategy has provided improvement, the decomposition onset temperature reported for these materials, starting at around 180° C., is still quite high. Moreover, at the degradation starting temperatures of these materials, the mass loss of the polymer remains below 50%, making it unlikely that a foam formulated with this approach would decompose enough to remove a packed item easily, and the contents of a package would still need to be mostly or even entirely dug out of the foam upon reaching its destination.

What is needed in the art is a low-temperature degrading polyurethane capable of use in foam-in-place applications as may be utilized for packaging securement and transportation. A polyurethane that moreover degrades to form primarily or exclusively gas phase products and that can limit or prevent the formation of hydrogen gas while retaining high energy emitting, e.g., γ-radiation emitting, materials would be of great benefit to the art.

SUMMARY

According to one embodiment, disclosed is a foamable composition that includes a polyol component and a multifunctional isocyanate component. The polyol component includes an allylic carbonate polyol and/or a benzylic carbonate polyol. The composition also includes a blowing agent and a degradation catalyst. Upon reaction, the foamable composition forms a polyurethane that includes allylic carbonate and/or benzylic carbonate in the polymer backbone. Beneficially, a polyurethane foam formed by the composition can exhibit a low degradation temperature, e.g., about 90° C. or less.

Also disclosed is a packaging system that includes a container and a foamable composition as described. A packaging system can be particularly beneficial for securement of high energy emitting materials, e.g., γ-radiating materials, as the polyurethane foam can act as a hydrogen sink, preventing the formation of hydrogen gas.

A method for packaging an article is also described. For instance, a method can include locating the article in a container and locating a foamable composition as described in the container. Upon locating the composition in the container (e.g., as a two-part composition with the parts separately added so as to contact one another immediately prior to addition or within the container), the foamable composition reacts to form a heat-labile polyurethane foam that secures the article within the container.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to foamable compositions that can be particularly beneficial for foam-in-place packaging purposes. More specifically, disclosed are foamable compositions that can be reacted to form a polyurethane foam that can be utilized to secure packaging contents inside a transport packages, and that at a later time can be readily decomposed by heating to about 90° C. or less, e.g., about 85° or less in some embodiments. Moreover, the decomposition products of the foam can be entirely or primarily (e.g., more than about 50 wt. %) gas-phase products, and the off-gas can include an inert gas.

The low decomposition temperature of the polyurethane foams can provide many benefits. For instance, as a polyurethane, the foam material can provide desirable mechanical (e.g., tensile, compressive, etc.) strength, while the low temperature degradation provides facile decomposition at a later time. Moreover, the low degradation temperature of the materials allows the materials to meet the regulatory load securement requirements for a radioactive material Type A shipping package during transport. As such, the materials can be utilized for securing high energy emitting materials, e.g., radioactive waste materials such as γ-radiating materials.

The storage and transport of radioactive materials by use of polymeric containment materials presents challenges, not the least of which is that the irradiation of saturated polymers generates hydrogen radicals, which can abstract a second hydrogen atom and form hydrogen ($H_2$) gas in a pseudo-first-order process that has no other fate to compete with it. Hydrogen ($H_2$) gas is by far the largest component of flammable gas evolved from most storage materials as a result of γ-irradiation. Aliphatic polymers such those based on polyethylene or polypropylene have a relatively high G-value, which is a measure of the γ-ray quantum yield for $H_2$ of polymers. Aromatic or other unsaturated polymers (which have a lower stoichiometric hydrogen content) have a lower G-value than aliphatic compounds, and this effect is not incremental, but can span orders of magnitude as expressed in G-values. For instance, poly(ethylene terephthalate) (PET), which has roughly one-seventh the hydrogen content of polyethylene, has a G-value more than 100 times smaller than that of polyethylene.

In accord with this observation, disclosed compositions incorporate a relatively low ratio of saturated to unsaturated carbons. For instance, disclosed polyurethane foams can have a ratio of aliphatic to aromatic or other unsaturated carbon bonds in the polyurethane backbone of from about 1:2 to about 1:4, such as about 1:3 in some embodiments. Incorporation of double/conjugated bonds can serve to create a sink for hydrogen radicals in the polymer itself. The radicals can add to double bonds, generating a more stable carbon-centered radical on the chain and eliminating the source of $H_2$ generation. The addition of oxidizing moieties in the polymer (even a mild one, such as an aromatic ring) can dramatically suppress γ-emission-driven $H_2$ evolution by hydrogen radical quenching and can thus make the disclosed polyurethane foams particularly beneficial for storage/transport of high-energy emitting materials.

In addition to a capability to function as a sink for hydrogen radicals, disclosed materials can also degrade to form non-toxic gases, e.g., nitrogen ($N_2$), carbon monoxide (CO), and/or carbon dioxide ($CO_2$). Formation of an inert gaseous phase at decomposition can also provide benefits. For instance, increased presence of such inert gas phase decomposition products can mitigate flammability risk of materials present in the packaging, e.g., radiolytically evolved hydrogen. Disclosed heat-labile decomposable polyurethane foams can thus also improve the fire safety profile of a package.

According to the present disclosure, the polyol component of a foamable composition can include an allylic and/or benzylic carbonate polyol that upon reaction with a diisocyanate can provide on the polyurethane backbone heat-labile carbonate bonds that in conjunction with a degradation catalyst can provide for polyurethane decomposition at low temperature. In one embodiment, an allylic and/or benzylic carbonate polyol can also provide one or more double/conjugated bonds that can serve as a hydrogen sink for hydrogen radicals produced during use of the polyurethane foam formed from the composition. Allylic and/or benzylic carbonate polyols that can be incorporated in a foamable composition according to the present disclosure can be in the form of a monomer, oligomer, polymer, or any combination thereof.

An allylic and/or benzylic carbonate polyol for inclusion in a foamable composition can in one embodiment include a reaction product of a first polyol (e.g., an allylic diol) with a reactive derivative of carbonic acid, such as, and without limitation to, phosgene or carbonyldiimidazole.

A process for forming an allylic and/or benzylic carbonate polyol can include one or multiple steps. By way of example, in one or two steps, a first polyol (e.g., a diol) can be converted to a di(chloroformate) or di(imidazoleformate) (e.g., N-imidazolecarboxylate) group, which can condense with a second polyol, which can be the same or differ from the first polyol, to form a condensation product that includes a carbonate moiety and two or more reactive hydroxyl end groups, i.e., and allylic and/or benzylic carbonate polyol as may be included in a foamable composition. The second polyol used in forming a carbonate polyol (and optionally also the first polyol, which can be the same or differ from the second polyol) can include one or more of allylic and benzylic linkages, optionally in conjunction with one or more secondary or tertiary R—O linkages that can confer acid sensitivity to the resulting allylic and/or benzylic carbonate polyol included in the foamable composition as well as the polyurethane foam formed from the foamable composition. For example, a diol such as cyclohex-2-ene-1,4-diol, 3-hexene-2,5-diol, 1,4-bis(1-hydroxyethyl)benzene can be reacted with phosgene in the presence of a base or other catalyst to form an allylic/benzylic carbonate polyol for inclusion in a foamable composition.

In one embodiment, an allylic and/or benzylic carbonate polyol component encompassed herein can have the following general structure:

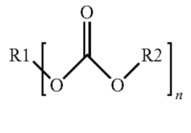

wherein the R1 group is the reaction product of the first polyol discussed above), the carbonate-R2 group is the reaction product of the second polyol discussed above, n is a whole number from 2 to 6, such as from 2 to 3, and in one embodiment 2, and at least the second polyol used in forming the carbonate polyol can include one or more allylic and/or benzylic linkages.

A polyol as may be utilized in forming an allylic and/or benzylic carbonate polyol for inclusion in a foamable composition can be an aliphatic, cycloaliphatic or an aromatic polyol containing 2, 3, 4, 5 or 6 hydroxy groups. Typically, the polyol contains 2 hydroxy groups, i.e., a glycol or bisphenol. An aliphatic polyol may be linear or branched and can generally contain from 2 to 10 carbon atoms. In some embodiments, an aliphatic polyol can be utilized that is an alkylene glycol having from 2 to 4 carbons atoms, ethylene glycol, propylene glycol, trimethylene glycol, tetramethylene glycol, or a poly(C2-C4) alkylene glycol, e.g., diethylene glycol, triethylene glycol, etc. Other useful polyols can include, without limitation, aromatic polyols, such as bisphenols, e.g., 4,4'-isopropylidenediphenol, and cycloaliphatic polyols, such as biscyclohexanols, e.g., 4,4'-isopropylidenebiscyclohexanol.

The polyurethanes can include additional heat-labile linkages in the backbone, in addition to carbonate linkages. For instance, in one embodiment, the compositions can include azo-containing polyols so as to incorporate heat labile azo linkages in the polymer backbone.

Suitable azo compounds encompass those that include one or more azo groups, and two or more hydroxy groups. Examples can include, without limitation, azobisisobutanol (ABIB), azobiscyanopropanol; azobiscyano-n-butanol; azobismethyl-N-hydroxyethylpropionamide; azoamidopolyalcohols; 4,4'-, 3,3'-, 3,4'-, 2,4'-, or 2,2'-dihydroxyazobenzene; 1,4-bis[(4-hydroxyphenyl)azo]benzene; 4,4'-, 3,3'-, or 2,2'-dihydroxymethylazobenzene; 4,4'-, 3,3'-, or 2,2'-dihydroxyethylazobenzeneand derivatives thereof, e.g. diols, such as 4,4'-bis(2-hydroxyethoxy)azobenzene, as well as any combination thereof.

A foamable composition can also include one or more conventional polyols used to form polyurethanes. Exemplary conventional polyols as may be included in a foamable composition can include, without limitation, polyhydroxy-containing polyesters, polyoxyalkylene polyether polyols, polyhydroxy-terminated polyurethane oligomers, polyhydroxy-containing phosphorus compounds, and alkylene oxide adducts of polyhydric polythioesters, polyacetals, aliphatic polyols, as well as any combination thereof.

The foamable composition can also include a multi-functional isocyanate component, generally a diisocyanate. The multi-functional isocyanate component may be any conventional multi-functional isocyanate used to form polyurethanes. Exemplary multi-functional isocyanates include, without limitation, toluene diisocyanate; monomeric methylene diisocyanates; polymeric methylene diisocyanates; 4,4'-, 2,4'-, or 2 2'-diphenylmethane diisocyanate; various polyphenylenepolymethylene multi-functional isocyanates (e.g., polymeric MDI), and mixtures of some or all of these compounds. Modified multivalent isocyanates which are products obtained by the partial chemical reaction of organic diisocyanates and/or multi-functional isocyanates are encompassed herein. Examples include, without limitation, diisocyanates and/or multi-functional isocyanates containing ester groups, urea groups, biuret groups, allophanate groups, carbodiimide groups, isocyanurate groups, and/or urethane groups.

In some embodiments, the multi-functional isocyanate component of the foamable composition can include about 80% by weight or greater methylene diisocyanate (MDI) and/or polymeric methylene diisocyanate (MDI).

The foamable composition may further include a chain extender. The chain extender may be an aromatic or aliphatic compound capable of reacting with at least two isocyanate terminated polymers units to form a polymer chain. Exemplary chain extenders may be aromatic or aliphatic compounds which are terminated with more than one hydroxyl or amine groups. These include compounds having at least two functional groups bearing active hydrogen atoms such as, but not limited to water, hydrazine, primary and secondary diamines, amino alcohols, amino acids, hydroxy acids, glycols, or mixtures thereof. An exemplary group of chain-extenders includes, without limitation, water, ethylene glycol, 1,4-butanediol, and primary and secondary diamines which react more readily with the prepolymer than does water such as, but not limited to phenylene diamine, 1,4-cyclohexane-bis-(methylamine), ethylenediamine, diethylenetriamine, N-(2-hydroxylpropyl)ethylenediamine, N,N'-di (2-hydroxypropyl)ethylenediamine, piperazine, and 2-methylpiperazine.

The foamable composition can also include a blowing agent. Chemical blowing agents can be used that form $CO_2$ upon reaction with polyisocyanates. Examples of chemical blowing agents can include, without limitation, azodicarbonamide, azo-bis-isobutyronitrile, sulfonyl hydrazide compounds, chlorofluorinated hydrocarbons, hydrogenated chlorofluorinated hydrocarbons and hydrogenated fluorinated hydrocarbons. Water can be utilized as a blowing agent in one embodiment. During reaction of the foamable composition, isocyanate groups can react with water to form $CO_2$. Water can be incorporated in the foamable composition as a liquid or alternatively in the form of salt hydrates.

The amount of blowing agent incorporated in the foamable composition can generally be in an amount of from about 2 wt. % to about 20 wt. % relative to the weight of the isocyanate component, for instance in an amount of from about 2 w/w % to about 5 w/w % relative to isocyanate content.

The foamable composition can also include an acid or photoacid as a degradation catalyst. The degradation catalyst can assist in encouraging the low temperature degradation of the polyurethane foam. As used herein, the term "photoacid" refers to molecules that reversibly or irreversibly undergo proton photodissociation and encompasses both photoacid generators, which undergo irreversible proton photodissociation as well as photoacids that undergo reversible proton photodissociation and thermal reassociation. Examples of photoacids can include, without limitation, sulfonium salts, acid imides, and diazo-disulfone compounds as well as any combination thereof. Exemplary sulfonium salts can include, without limitation, trimethyl sulfonium/trifluoromethane sulfonate, triphenyl sulfonium/trifluoromethane sulfonate, cyclohexyl methyl (2-oxo-cyclohexyl) sulfonium/trifluoromethane sulfonate, cyclopentyl methyl (2-oxo-cyclohexyl) sulfonium/trifluoromethane sulfonate, and 2-oxocyclohexyl methyl (2-norbornyl) sulfonium/trifluoro methane sulfonate. Exemplary acid imides can include, without limitation, trifluoromethyl sulfonyloxy-7-oxabicyclo[2,2,1]hept-5-ene-2,3-dicarboxylimide, trifluoromethyl sulfonyloxy bicyclo[2,2,2,]hept-5-ene-2,3-carboxylimide, and trifluoromethyl sulfonyloxy succinimide. Exemplary diazo-disulfone compounds can include, without limitation, 1-cyclohexyl sulfonyl-1-(1,1-dimethylethyl sulfonyl) diazomethane, bis(1,1-dimethyl ethyl sulfonyl) diazomethane, bis(1-methylethyl sulfonyl) diazomethane, bis(cyclohexylsulfonyl)diazomethane, bis(isopropylsulfonyl) diazomethane, bis(tert-butylsulfonyl)diazomethane, tert-butyl sulfonyl methyl sulfonyl diazomethane, cyclohexyl sulfonyl ethyl sulfonyl diazomethane, or any combination thereof.

Other acid degradation catalysts encompassed herein can include Lewis acids or Bronsted-Lowry acids. Exemplary Lewis acid degradation catalysts encompassed herein can include, without limitation, Ziegler-type catalysts, such as the titanium-, vanadium-, hafnium-, and zirconium-containing compounds; halides, alkyl halides and alkyl compounds of aluminum, magnesium, tin, and zinc; halides of boron; and equivalents and combinations thereof. Exemplary Bronsted-Lowry acid degradation catalysts can include, without limitation, sulfonic acid, phosphonic acid, acetic acid, isophthalic acid, boronic acid, and perfluorinated acid.

In some embodiments, additional $H_2$ quenching reagents can be included in a foamable compositions, which can provide a more aggressive $H_2$ quenching capability to the polyurethane foams. When included, quenching reagents can be selected from highly active small molecule mild organic oxidants such as nitroaromatics or 2,2,6,6-tetramethylpiperidine 1-oxyl (TEMPO)-based radical scavengers. Exemplary quenching reagents can include, without limitation, biphenyl, p-toluenesulfonic acid, 2,4-dinitrotoluene, benzoquinone, 4-hydroxy-2,2,6,6-tetramethylpiperidine 1-oxyl (4-hydroxy-TEMPO), 4-oxo-TEMPO, etc.

A foamable composition can include other additives as are generally known in the polyurethane foam art in add-in amounts as are generally utilized. Such additives can include, without limitations, polymerization catalysts, surfactants, stabilizers, dyes, fillers, pigments, flame retardants, etc., in any combination.

Exemplary catalysts can include, without limitations, organic compounds such as tertiary amines (triethylamine, tributylamine, N-methylmorpholine, N-ethylmorpholine, N,N,N',N'-tetramethylethylenediamine, pentamethyl-diethylenetriamine, 1,4-diazabicyclo(2,2,2)octane, N-methyl-N'-dimethylaminoethylpiperazine bis-(dimethylaminoalkyl) piperazine, N,N-dimethylbenzylamine, N3N-dimethylcyclohexylamine, N,N-diethylbenzylamine, bis-(N,N-diethylaminoethyl)adipate, N,N,N',N'-tetramethyl-1, 3-butanediamine, N,N-dimethyl-phenylethylamine, 1,2-dimethylimidazole, 2-methylimidazole), monocyclic and bicyclic amines together with bis-(dialkylamino)alkylethers such as 2,2-(bis-(dimethylamino)ethyl)ether. Other examples of suitable catalysts can include inorganic compounds, for instance those based on tin compounds, such as tin salts of carboxylic acids including, without limitation, tin acetate, tin octoate, tin laurate, tin ethylhexanoate and tin (IV) compounds, such as dibutyltin(IV) oxide, dibutyltin (IV) dichloride, dibutyltin(IV) diacetate, dibutyltin(IV)laurate, dibutyltin(IV) maleate and dioctotin(IV) diacetate. The catalytic components are generally used in the form of mixtures thereof in the total amount of 0.01-0.4% why, relative to the total mass of the mixture.

In embodiments, a foamable composition can include a thickener (which may be used to impart increased hydrophilicity) and/or a surfactant (which may be used to adjust the foam characteristics). Sulfonated castor oil, silicone oil (e.g., polydimethyl siloxane, polyoxyalkylenether-polydimethyl siloxane block copolymer), triethylamine oleate, dimethylamine ricinoleate, or diethylamine or triethylamine mixtures with a suitable fatty acid, e.g., oleic, ricin acids etc., can be used as a surfactant that can provide for the complete homogenization of reaction components and assure desired foam stability and strength.

Powdered or fibrous inorganic fillers can be included in a foamable composition, for instance in order to increase the volume mass of the polyurethane foam. Powdered fillers can also support a regular cell structure formation. Organic fillers such as starch, wood flour etc., contain hydroxyl groups, which can react with isocyanate groups, however, since these fillers are solid substances, the reaction rate in the heterogeneous phase is slow and these fillers generally act as inert additives.

Particles of phenolic resins and polystyrene can be also used as fillers in some embodiments. Further, inorganic fillers such as clays and talc can be utilized in some embodiments. Such additives can function in the foam in a similar fashion to synthetic fillers, without affecting the foam hygroscopic properties.

A foamable composition can also include one or more pigments. Pigments have to be somewhat resistant to an elevated temperature, due to the exothermic nature of the foam formation reaction of polyisocyanate with polyol.

The foamable composition can optionally include flame retardants as are known in the art, for instance those based upon aryl bromides and/or phosphates, such as trichloroethylphosphate, antimony(III)oxide, chlorinated paraffins with antimony(III) oxide, etc.

Additives including surfactants, stabilizers, fire retardants, fillers, antioxidants, flame retardants, pigments, etc., can generally mixed with the polyol component prior to its reaction with the polyisocyanate.

In forming a polyurethane foam from a foamable composition, the foamable composition can generally be provided in two portions. In general, a pre-polymer technique can be utilized in which an excess of the multi-functional isocyanate component is reacted in a first step with a portion of the polyol component to provide a prepolymer having free isocyanate groups. The second, final step of the foam formation can include combination of the prepolymer with a second portion including additional polyol component and a blowing agent (e.g., water) to form the foam. Generally, the second portion can include the additional polyol combined with other additives of interest, e.g., chain extenders, reaction catalysts, surfactants, fillers, etc., and this mixture can be combined with the prepolymer portion.

In one embodiment, the allylic carbonate and/or benzylic carbonate polyol component can be reacted with the multi-functional isocyanate component to form an allylic carbonate/benzylic carbonate-containing prepolymer. When utilizing a diisocyanate, the molar ratio of allylic carbonate/benzylic carbonate polyol compound(s) to diisocyanate is generally in the range of about 1:2.0 to about 1:2.5. If a higher functional isocyanate is used, the molar ratio can be modified adequately.

In the second step, the prepolymer portion can be combined with the additional polyol portion (e.g., additional polyol mixed with other components of the system (e.g., catalyst, blowing agent and optionally other additives)) so as to maintain the desired isocyanate index ([NCO]/[OH]×100), as is known in the art.

In one embodiment, the resulting foam can include the isocyanate component in a stoichiometric ratio relative to other components with an isocyanate index equal to about 100 (e.g., from about 90 to about 105). However, this is not a requirement of the resulting foams and in other embodiments, the foam can have an isocyanate index less than or greater than 100. For instance, a foam having an isocyanate content lower than the stoichiometric ratio, e.g. having the isocyanate index in the range of about 70 to about 90, can exhibit a lower covalent cross-link density as compared to those having a higher isocyanate index, resulting in a more elastic foam. A foam that includes an excess of isocyanate relative to polyol, e.g., having the isocyanate index of from about 105 to about 110, can be a harder foam than those having a lower isocyanate index.

During use, the portions of the foamable composition can be combined immediately prior to or in conjunction with locating the foamable composition in a container that contains an article for securement. For example, an injection gun can be connected to supplies of the respective components of the foamable composition, and the components can be mixed within the injection gun or immediately upon exit from the injection gun. The chemicals are mixed either within or upon exit from the gun to form the foamable composition. Upon mixing, the prepolymer, the polyol component, the blowing agent, any chain extender, etc., can react to form the polyurethane foam in the container. In some embodiments, the system can include a liner to surround the article, and/or a liner between the foam and the inner surface of the container.

At a later time, when the article is to be removed from the securing foam, the foam can be heated to a relatively low temperature, e.g., no more than about 90° C., such as from about 70° C. to about 90° C., or from about 75° C. to about 85° C. in some embodiments, and the foam can be degraded to form primarily gaseous degradation products, e.g., nitrogen, carbon monoxide, and/or carbon dioxide. In some embodiments, a degradation process can also include addition of ultra-violet (UV) radiation to the foam to encourage the low temperature degradation. This approach can be utilized in those embodiments in which the foamable composition includes a photoactive degradation catalyst, and can increase the rate of degradation and/or encourage a lower temperature degradation.

While certain embodiments of the disclosed subject matter have been described using specific terms, such description is for illustrative purposes only, and it is to be understood that changes and variations may be made without departing from the spirit or scope of the subject matter.

What is claimed is:

1. A foamable composition comprising:

a polyol component comprising a first polyol component and a second polyol component;

a multi-functional isocyanate component;

a blowing agent; and a degradation catalyst;

wherein the foamable composition comprises a first portion and a second portion, the first portion comprising a prepolymer that is the reaction product of the first polyol component and the multi-functional isocyanate component, the second portion comprising the second polyol component;

wherein either the first or the second polyol component comprises an allylic and/or a benzylic carbonate polyol, the allylic and/or the benzylic carbonate polyol having been formed from at least one polyol including one or more secondary or tertiary R—O linkages;

wherein upon reaction, the foamable composition forms a polyurethane foam that includes allylic carbonate and/or benzylic carbonate linkages in the polyurethane backbone, the degradation catalyst assisting in the degradation of the polyurethane foam;

and wherein a foam formed from the foamable composition has a degradation temperature of about 90° C. or less.

2. The foamable composition of claim 1, wherein the second portion comprises the blowing agent and the degradation catalyst.

3. The foamable composition of claim 1, wherein the first polyol component comprises the allylic and/or the benzylic carbonate polyol.

4. The foamable composition of claim 1, wherein the second polyol component comprises the allylic and/or the benzylic carbonate polyol.

5. The foamable composition of claim 1, wherein the blowing agent comprises water.

6. The foamable composition of claim 1, wherein the polyol component further comprises an azo compound comprising one or more azo groups and two or more hydroxy groups.

7. The foamable composition of claim 1, wherein the polyol component further comprises a polyhydroxy-containing polyester, a polyoxyalkylene polyether polyol, a polyhydroxy-terminated polyurethane oligomer, a polyhydroxy-containing phosphorus compound, an alkylene oxide adducts of a polyhydric polythioester, a polyacetal, an aliphatic polyols, or any combination thereof.

8. The foamable composition of claim 1, wherein the composition further comprises a chain extender.

9. The foamable composition of claim 1, wherein the degradation catalyst comprises a photoacid, a Bronsted-Lowry acid, or a combination thereof.

10. The foamable composition of claim 1, wherein the composition further comprises a hydrogen quenching reagent, a surfactant, a filler, a flame retardant, a pigment, or any combination thereof.

11. A packaging system comprising a container and the foamable composition of claim 1.

12. The packaging system of claim 11, further comprising a liner.

13. The foamable composition of claim 1, wherein the polyurethane foam has a ratio of aliphatic to aromatic or other unsaturated carbon bonds in the polyurethane backbone of from about 1:2 to about 1:4.

14. The foamable composition of claim 1, wherein the multi-functional isocyanate comprises monomeric methylene diisocyanate (MDI), polymeric methylene diisocyanate (MDI), or a combination thereof.

15. A foamable composition comprising:

a polyol component, the polyol component comprising an allylic and/or a benzylic carbonate polyol, the allylic and/or the benzylic carbonate polyol having been formed from at least one polyol including one or more secondary or tertiary R—O linkages;

a multi-functional isocyanate component;

a blowing agent; and a degradation catalyst;

wherein upon reaction, the foamable composition forms a polyurethane foam that includes allylic carbonate and/or benzylic carbonate linkages in the polyurethane backbone, the degradation catalyst assisting in the degradation of the polyurethane foam;

and wherein a foam formed from the foamable composition has a degradation temperature of about 90° C. or less.

16. The foamable composition of claim 15, wherein the polyol component further comprises an azo compound comprising one or more azo groups and two or more hydroxy groups.

17. The foamable composition of claim 15, wherein the degradation catalyst comprises a photoacid, a Bronsted-Lowry acid, or a combination thereof.

18. A method for packaging an article, the method comprising locating the article in a container and locating the foamable composition of claim 1 in the container.

19. The method of claim 18, the method further comprising at a later time, reacting the first portion and the second portion to form the polyurethane foam and heating the polyurethane foam to a temperature of about 90° C. or less, upon which the polyurethane foam degrades.

20. The method of claim 19, wherein products formed from the degradation of the polyurethane foam comprise about 50 wt. % or more gas-phase products.

21. The method of claim 19, further comprising subjecting the polyurethane foam to ultra-violet radiation in conjunction with heating the polyurethane foam.

22. The method of claim 18, wherein the article comprises a γ-radiating material.

23. The method of claim 18, further comprising providing a first liner between the article and the foamable composition.

24. The method of claim 23, further comprising providing a second liner between an inner surface of the container and the foamable composition.

* * * * *